US009845146B2

(12) United States Patent
Beaufrere

(10) Patent No.: US 9,845,146 B2
(45) Date of Patent: Dec. 19, 2017

(54) ZOOM CLIMB PREVENTION SYSTEM FOR ENHANCED PERFORMANCE

(71) Applicant: The Boeing Company, Chicago, IL (US)

(72) Inventor: Henry L. Beaufrere, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/921,841

(22) Filed: Oct. 23, 2015

(65) Prior Publication Data

US 2017/0113786 A1    Apr. 27, 2017

(51) Int. Cl.
*B64C 13/04* (2006.01)
*B64C 13/50* (2006.01)
*B64C 5/02* (2006.01)
*G05D 1/06* (2006.01)

(52) U.S. Cl.
CPC .............. *B64C 13/503* (2013.01); *B64C 5/02* (2013.01); *B64C 13/04* (2013.01); *G05D 1/0607* (2013.01)

(58) Field of Classification Search
CPC .......... B64C 13/503; B64C 5/02; B64C 13/04
See application file for complete search history.

(56) References Cited

U.S. PATENT DOCUMENTS

| 3,686,626 | A | * | 8/1972 | Bateman | ................ | B64D 43/02 244/181 |
|---|---|---|---|---|---|---|
| 3,963,197 | A | | 6/1976 | Oberlerchner | | |
| 4,027,839 | A | * | 6/1977 | Quinlivan | ............ | G05D 1/0607 244/181 |
| 5,220,322 | A | * | 6/1993 | Bateman | ................ | G01C 5/005 340/967 |
| 5,722,620 | A | * | 3/1998 | Najmabadi | ............. | B64C 13/16 244/181 |
| 5,803,408 | A | | 9/1998 | Gast | | |
| 6,158,695 | A | * | 12/2000 | Najmabadi | ............. | B64C 13/16 244/183 |
| 8,214,089 | B2 | * | 7/2012 | Caldeira | ............. | G05D 1/0833 244/181 |
| 2005/0278085 | A1 | * | 12/2005 | Warkomski | ............ | G05D 1/107 701/6 |
| 2009/0047636 | A1 | * | 2/2009 | Van Biervliet | .......... | G09B 9/12 434/55 |
| 2013/0138274 | A1 | * | 5/2013 | Caldeira | ............. | G05D 1/0676 701/16 |

(Continued)

OTHER PUBLICATIONS

David Saussie et al, Longitudinal Flight Control Design with Handling Quality Requirements, Jan. 2005.*

(Continued)

*Primary Examiner* — Redhwan K Mawari
*Assistant Examiner* — Alan D Hutchinson
(74) *Attorney, Agent, or Firm* — Miller, Matthias & Hull LLP

(57) ABSTRACT

A vehicle, such as an airplane sets a limit for a control variable used to deflect a control surface. The limit is set as a function of an unfavorable flight condition/target angle of attack and a rate of change of angle of attack so that a pilot control variable command is prevented from exceeding the limit to prevent the vehicle from reaching an unfavorable flight condition and/or exceeding a desired angle of attack limit.

13 Claims, 8 Drawing Sheets

(56) References Cited

U.S. PATENT DOCUMENTS

2014/0253348 A1* 9/2014 Maeda .................. B64D 43/02
                                                        340/966

OTHER PUBLICATIONS

John D Anderson Jr., Introduction to Flight, Third Edition, 1989, pp. 184-187.*

SAE Technical Paper Series; Airbus A320 Side Stick and Fly by Wire—An Update, S. G. Corps; Aerospace Technology Conference and Exposition; Long Beach, California; Oct. 13-16, 1986; p. 1-16.

Nilolas Tekles, Enric Xargay, Ronal Choe, Naira Hovakimyan, Irene M. Gregory, Florian Holzapfel; Flight Envelope Protection for NASA's Transport Class Model; American Institute of Aeronautics and Astronautics; Jan. 13-17, 2014; p. 1-47.

Obi I. Iloputaife; Design of Deep Stall Protection for the C-17A; McDonnell Douglas Aerospace, Long Beach, California 90807-4418; Journal of Guidance, Control, and Dynamics; vol. 20, No. 4; Jul.-Aug. 1997; p. 1-8.

Search Report for related European Application No. EP16194995.3; dated Feb. 28, 2017.

* cited by examiner

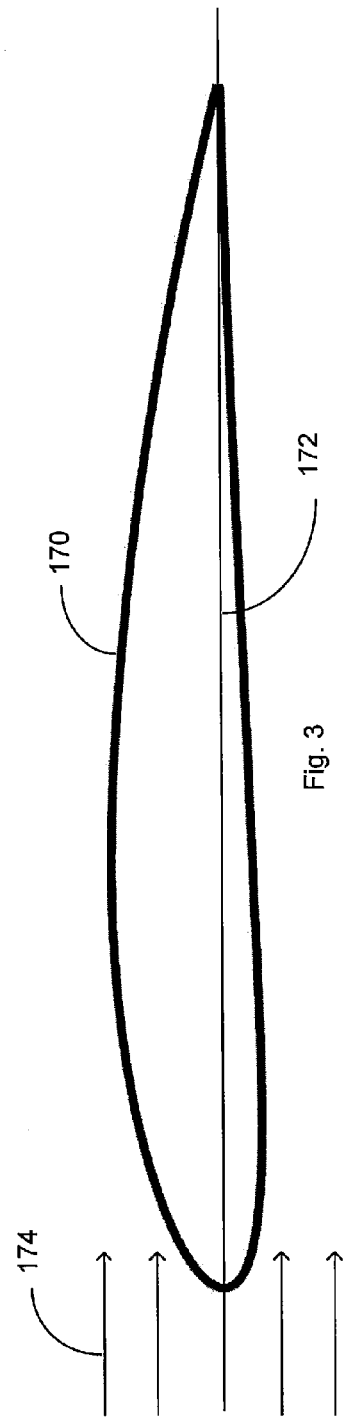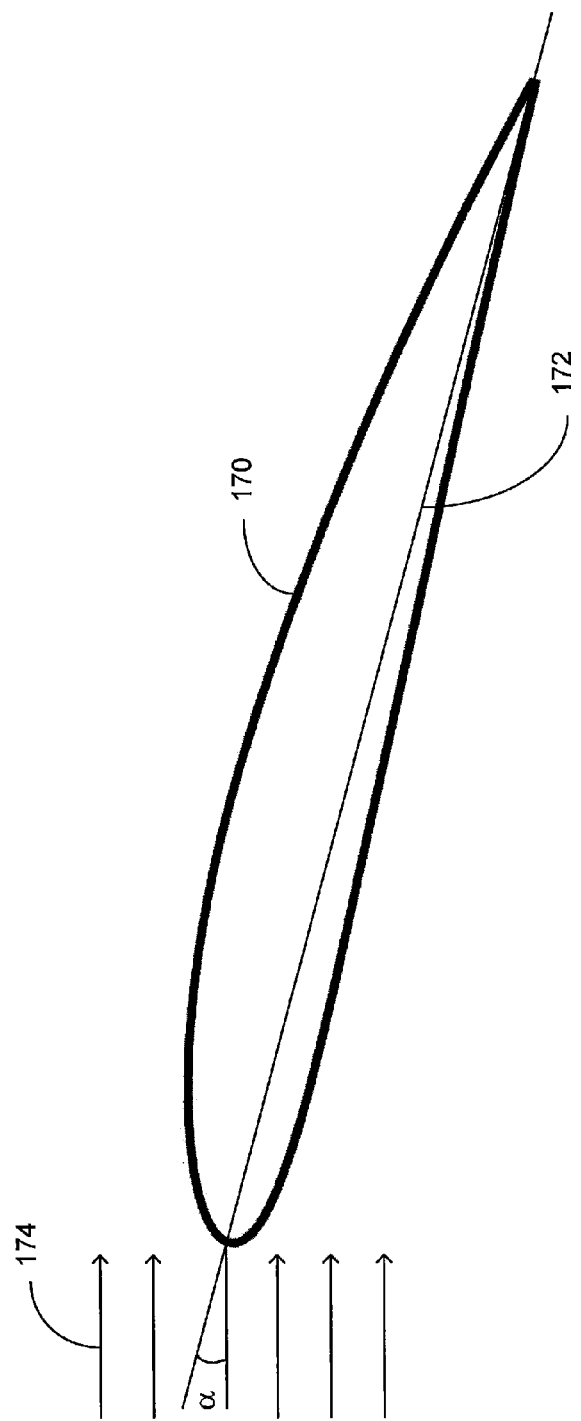

ZOOM CLIMB PREVENTION SYSTEM FOR ENHANCED PERFORMANCE

FIELD

This disclosure relates generally to aircraft controls and more particularly to prevention of an unfavorable flight condition at high angles of attack or exceeding a desired angle of attack in a fly-by-wire aircraft.

BACKGROUND

Fly-by-wire airplanes attempt to limit angle of attack to prevent an unfavorable flight condition (UFC) that can occur at high angles of attack including reduction of lift beyond acceptable limits, high-speed buffet, pitch up, lateral-directional instabilities or combinations of these. These conditions can be avoided by limiting the angle of attack to something at or slightly below the angle of attack beyond which these undesirable characteristics occur. Angle of attack is closely related to velocity (airspeed) and increases inversely with velocity. However, a rapid deceleration can cause the current angle of attack to quickly exceed a desired angle-of-attack limit and leave the aircraft exposed to a condition that is difficult to control or any of the other undesirable characteristics noted above.

SUMMARY

In an aspect of the disclosure, a method of enhancing operational aspects of a vehicle includes setting a limit for a control variable used to deflect a control surface where the limit is set as a function of an unfavorable flight condition and/or a desired target angle of attack and a rate of change of angle of attack ($\dot{\alpha}$). The method also includes preventing a pilot control variable command from exceeding the limit.

In another aspect of the disclosure, a method of enhancing operational aspects of a vehicle includes deflecting a control surface using a control loop and determining a condition exists. When the condition exists, setting a limit on deflecting the control surface based on a rate of change of angle of attack.

In yet another aspect of the disclosure, a system that enhances operational aspects of a vehicle includes an airframe, a flight control used by a pilot to set a control variable related to an attitude of the vehicle, and a control surface that affects the attitude of the vehicle in flight. The system also includes an angle-of-attack sensor and an angle-of-attack rate sensor coupled to the airframe and a flight-critical digital computer coupled to the flight control, the angle-of-attack sensor, and the control surface. The flight-critical digital computer includes a processor and a memory, the memory having computer executable instructions that when executed by the processor cause the flight-critical digital computer to receive the control variable from the flight control and deflect the control surface responsive to the control variable received from the flight control. The flight-critical digital computer also determines that the control variable exceeds a threshold value and when the control variable exceeds the threshold value, sets a limit on the control variable as a function of an unfavorable flight condition and/or desired target angle of attack and a rate of change of angle of attack in order to restrict the deflection of the control surface to prevent the vehicle from reaching UFC or exceeding a desired angle-of-attack limit.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

For a more complete understanding of the disclosed methods and apparatuses, reference should be made to the embodiment illustrated in greater detail on the accompanying drawings, wherein:

FIG. 3 is an illustration of angle of attack;

FIG. 4 is another illustration of angle of attack;

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

Figure 1:
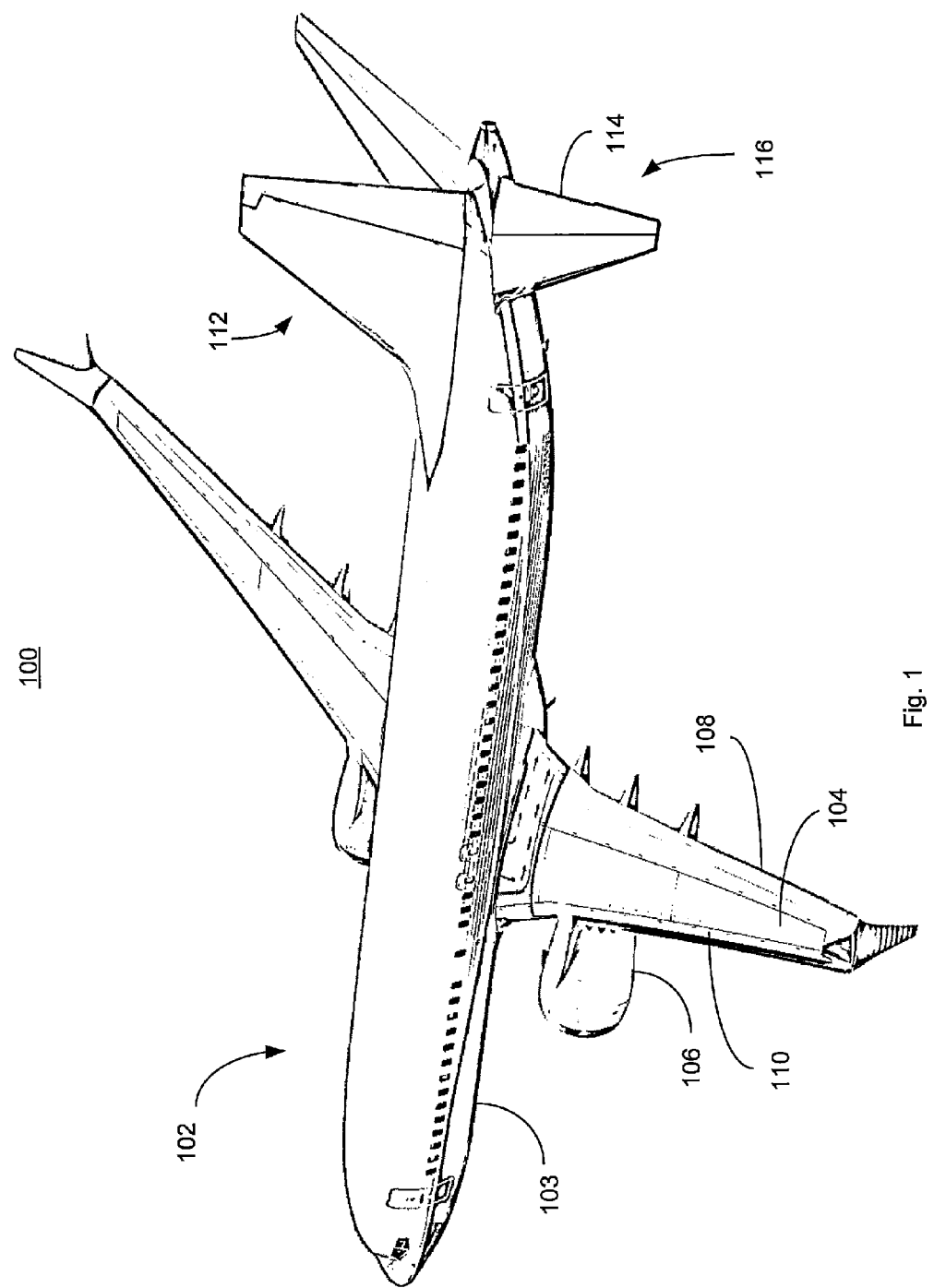
FIG. 1 is a perspective view of a representative vehicle in accordance with the current disclosure.

FIG. 1 illustrates a vehicle 100. The vehicle 100, in the illustration of FIG. 1, an aircraft, has an airframe 102 including a fuselage 103 and a wing 104. A propulsion unit 106 may be coupled to the wing 104. The wing 104 may also include flaps 108 and leading-edge devices 110 that may be deployed in certain situations, such as landing, to increase wing leading-edge camber resulting in more lift. A tail section 112 includes an elevator 114 that is an example of a control surface 116 that affects the pitch attitude of the vehicle in flight.

Figure 2:
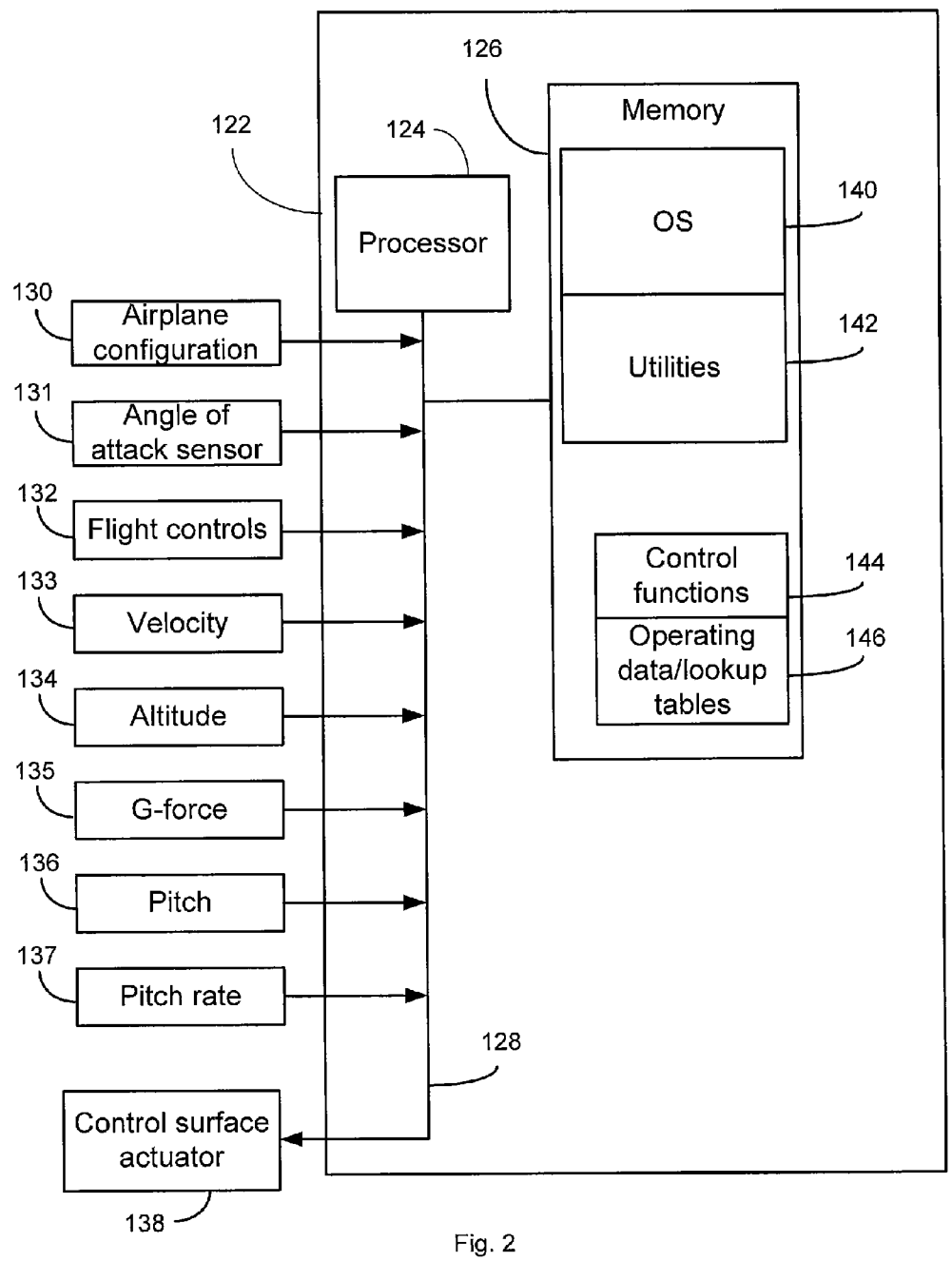
FIG. 2 is a block diagram of a flight-critical digital computer used in the vehicle of FIG. 1.

FIG. 2 is a block diagram of additional elements of the vehicle 100. A flight-critical digital computer 122 includes a processor 124 and a memory 126. A data-input/output bus 128 couples the processor 124 to the memory 126. The bus 128 also connects the flight-critical digital computer 122 to various inputs and outputs, including, but not limited to, vehicle configuration 130, an angle-of-attack sensor 131, flight controls 132, a velocity sensor 133, an altitude sensor 134, a g-force sensor 135, a pitch sensor 136, and a pitch rate sensor 137. The vehicle configuration 130 represents inputs from a number of sensors and/or actuators that determine the state of the vehicle 100 including positions of leading-edge devices 110, flaps 108, elevator 114, etc.

Turning briefly to FIGS. 3 and 4, angle of attack (α) is defined as the angle between the chord 172 of a wing 170 and the airflow 174. FIG. 3 illustrates zero α, while FIG. 4 illustrates a positive α. Returning to FIG. 2, the α sensor 131 may be a LIDAR sensor or α may be determined using an array of pressure sensors (not depicted), vanes, or another mechanism. The flight controls 132 may include well-known column/wheel and throttle controls for commanding pitch/roll and engine power, respectively, of the vehicle 100. The velocity sensor 133 may use a pitot tube, GPS, inertial sensors, LIDAR, etc., to report velocity (airspeed), groundspeed, or both. The altitude sensor 134 may use air pressure, GPS, a radar transponder, etc., to determine an altitude of the vehicle 100. The g-force sensor 135 measures acceleration in terms of force relative to gravity. The pitch sensor 136 and pitch rate sensor 137 measure the pitch and rate of change of pitch of the vehicle 100, respectively where pitch is the fore-to-aft attitude of the vehicle 100 with respect to the horizon.

The flight-critical digital computer 122 may also include one or more outputs, such as an output that operates a control surface actuator 138, such as a hydraulic cylinder or electric servomotor, to deflect a control surface 116, such as elevator 114. Additional outputs for other control surfaces, including rudder, spoilers and ailerons may also be commanded from the flight-critical digital computer 122, but are intentionally omitted for clarity.

The processor 124 is a hardware device physically configured to execute instructions stored in the memory 126. The memory 126 may be a semiconductor memory including but not limited to RAM, ROM, PROM and other solid state structures but may also include a mass storage device, and/or a removable storage medium such as a CD, DVD, and/or flash memory device, but does not include propagated media such as a carrier wave. The memory 126 may include an operating system 140 used to manage operations of the flight-critical digital computer 122 and utilities 142 used to configure and diagnose conditions in the flight-critical digital computer 122. The memory 126 may also include instructions for control functions 144 as well as operating data and/or lookup tables 146. The control functions 144 may include instructions that, when executed by the processor 124 cause the flight-critical digital computer 122 to receive a control variable from the flight control, determine a desired setting for a control surface 116, and move the control surface 116 responsive to the control variable.

The control functions 144 may also include instructions used to determine that the control variable exceeds a threshold value. In an embodiment, the threshold value may be stored in the operating data and lookup tables 146. The control variable may be a g-force command (g-cmd), sometimes called a load factor, or an angle-of-attack command (α-cmd). In other embodiments, another figure of merit may be used for the command variable as is known in the C* command system (a g-command system based on a combination of normal force and pitch rate commands with units in g's) or the C*U command system used by various airplane manufacturers. In this discussion, control variable will be referred to a c*-cmd. For example, many modern systems use primarily a g-force (g-cmd) signal when the vehicle 100 is above a certain velocity when configured for non-terminal operations. The control loop in this instance may be based on flight control regulation of aircraft normal acceleration, for example, from −0.5 g to +2.5 g. In other instances, for example, when the vehicle 100 is landing, the control loop may be more responsive to a pitch rate command than a normal acceleration command.

As discussed more below, if, for example, a c*-cmd value above a threshold would cause the vehicle 100 to decelerate too rapidly, a limit may be placed on the c*-cmd. In an embodiment, the command variable may be limited as a function of a target angle of attack (UFC angle of attack and/or another target angle of attack) and rate of change of angle of attack in order to prevent an unfavorable flight condition or to prevent exceeding a desired target angle of attack from occurring. When operating in this fashion, the UFC/target angle of attack may be determined by the flight-critical digital computer 122 using a combination of the velocity 218 of the vehicle 100 reported by the velocity sensor 134 and the altitude 227 reported by the altitude sensor 136. That is, because there is no fixed UFC/target angle of attack, the UFC/target angle of attack value can be determined in real time based on these and other conditions such as wing configuration.

Figure 5:
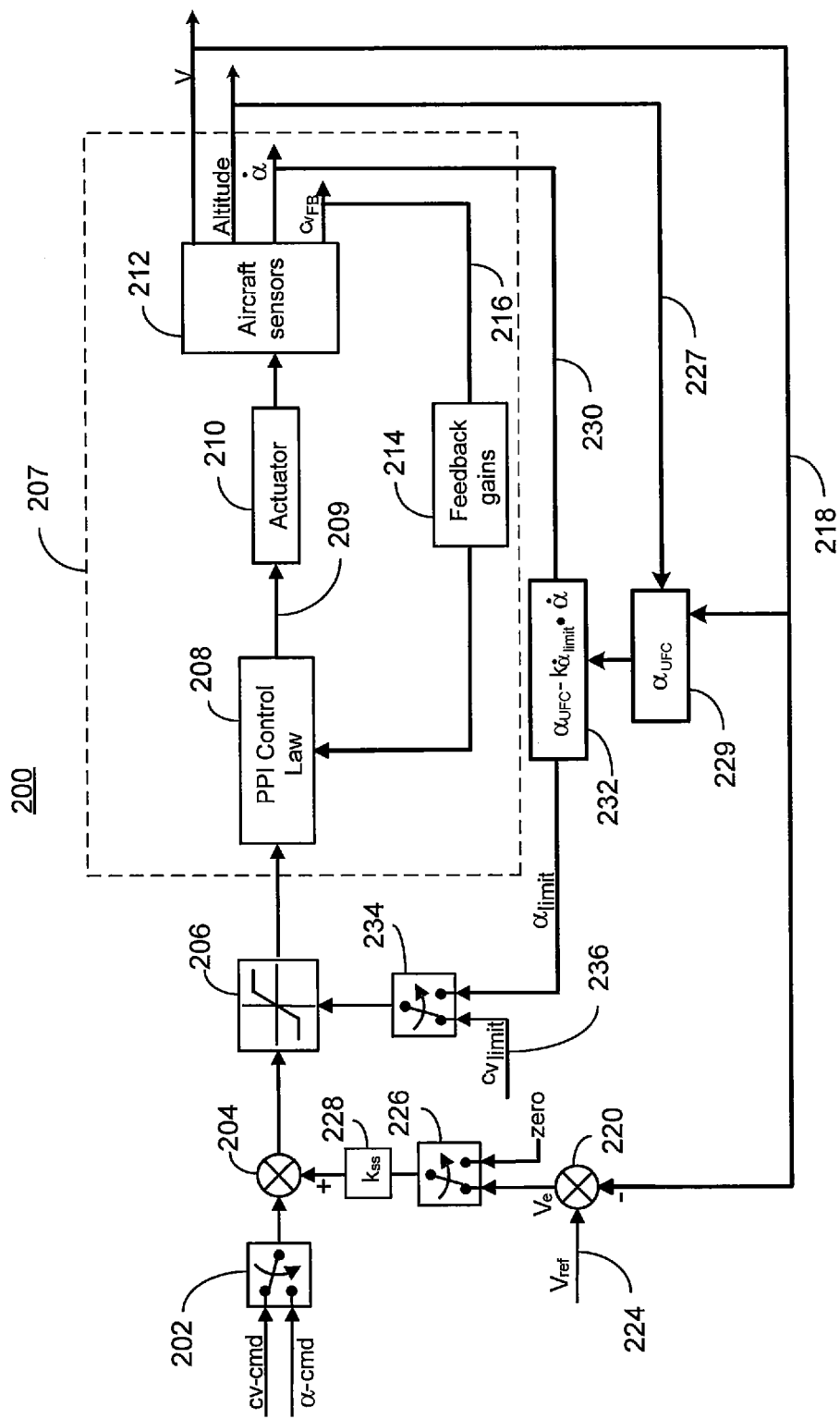
FIG. 5 is a diagram of a command loop in accordance with the current disclosure.

A diagram of a command loop 200 is shown in FIG. 5 that is used to avoid UFC while the vehicle 100 is involved in a zoom claim. A zoom climb is a climb where the rate of climb is greater than the maximum for a sustained climb, as determined from the thrust of the aircraft's engines. The command loop 200 is used for enhancing operational aspects, such as limiting the angle of attack of a vehicle 100. When in normal flight, with zoom climb UFC/angle-of-attack protection inactive, three selectors: a command selector 202, a velocity feedback selector 226, and a limit selector 234 are all in the deselected positions shown in FIG. 5. In this state, the command loop 200 operates in a conventional manner. The current control-variable command (cv-cmd), based on the pilot's positioning of the flight controls 132 are used as the input variable. The actual control variable passed as the cv-cmd may be based on a current flight profile as discussed above.

After the cv-cmd is received and passed through the command selector 202, a velocity error feedback term is added into the cv-cmd at an operator 204. The resulting control variable is clipped at a limiter 206 based on a control variable limit 236, discussed below. A flight control loop 207 is used to manage the actual control surfaces of the vehicle 100. A proportional plus integral (PPI) operator 208 takes the output of the limiter and uses the feedback values discussed below to generate a command 209 that controls an actuator 210, such as a hydraulic cylinder or electric motor (not depicted), connected, in an embodiment, to an elevator 114. Movement of the actuator/elevator changes the attitude of the vehicle 100 allowing sensors 212 to determine flight characteristics used for feedback in the command loop 200.

Velocity (V) 218 (that is, airspeed) is fed to a summer 220 that compares the current velocity V 218 to a reference velocity 224 to produce a velocity error signal Ve. The velocity error signal Ve is multiplied by a scaling factor $k_{ss}$ at block 228 and the resulting velocity error feedback term is added at operator 204. The control variable feedback terms 216, e.g., g-force, pitch rate, angle of attack, etc., depending on control scheme, is parametrically varied in the feedback gain block 214 and provided to the PPI operator 208. The feedback gain value or values of feedback gain block 214 may be varied with flight condition to achieve the desired response characteristics.

A control variable limit (cv-limit) 236 is set based on the cv-cmd type. For example, if the cv-cmd is a g-cmd, then the cv-limit 236 may be set at 2.5 g, meaning that even if the pilot moves the column full aft, the vehicle 100 will not exceed a g-force of 2.5 g. Similarly, if the cv-cmd is an α command, the limit may be 14 degrees.

When a threshold value for a cv-cmd is exceeded, the command loop 200 is switched to the zoom climb UFC prevention mode. The entry and exit from this mode is discussed in more detail below with respect to FIG. 7. Upon entering the zoom climb UFC prevention mode, each of the selectors, 202, 226, and 234 are switched. The command selector 202 forces the cv-cmd control commands from the current selection, e.g., c*-cmd, to α command. The velocity feedback selector 226 removes velocity 218 feedback from the loop and sets the velocity feedback error value to zero, as the α-command system is inherently velocity stable and does not require velocity feedback for this purpose. Lastly, the limit selector 234 is set from the current value of cv-limit 236 to a variable value, α-limit. α-limit is a function of rate of a change of angle of attack ($\dot{\alpha}$) 230. Operator 232 sets the α-limit according to the formula $$\alpha\text{-limit} = [\alpha_{UFC}|\alpha\text{-target}] - k\dot{\alpha}_{limit} * \dot{\alpha}$$

where: UFC is shorthand for unfavorable condition, $[\alpha_{UFC}|\alpha\text{-target}]$=either one of the current unfavorable condition angle based on observed conditions or a target angle of attack, and $k\dot{\alpha}_{limit}$ is selected to set the transition point between c*-cmd and α-cmd based on simulation information. This value, like $\alpha_{UFC}$ may be generated empirically and varies with the condition in question, vehicle configuration, and flight conditions such as altitude and velocity.

The value for $\alpha_{UFC}/\alpha$-target and $k\dot{\alpha}_{limit}$ may be selected from a look-up table or formula at block 229. The values are a function of velocity 218, altitude 227, and wing configuration (flap and leading-edge devices) and are unique for each vehicle type. For example, the unfavorable condition angle of attack ($\alpha_{UFC}$) is higher at lower velocities. At higher velocities, Mach/compressibility effects can cause high-speed buffet and unfavorable conditions at a lower angle of attack. The wing configuration also affects stall angle of attack, e.g. with leading-edge devices 110 extended, flow separation on the wing airfoil is delayed thereby increasing the angle of attack at which a wing unfavorable condition occurs. The calculated α-limit is then set as the maximum values of the limiter 206, and correspondingly, as the maximum value of the α-cmd passed to the PPI operator 208. The α-limit is calculated in real time as a function of the $\alpha_{UFC}$ and/or desired a target and the second-order term $\dot{\alpha}$ prevents angle of attack (α) from exceeding its target limit. Setting the limit on the limiter 206 to the α-limit is therefore a function of the current conditions (α, $\dot{\alpha}$) and state of the command loop 200 being in the α-cmd mode so that the limit selector 234 is set accordingly. Setting the limit prevents the control surface 116 from being deflected enough to cause a UFC or from exceeding a target angle of attack.

While this disclosure discusses both the ability to limit the vehicle below an unfavorable condition angle of attack ($\alpha_{UFC}$) or another target α, in reality the $\alpha_{UFC}$ is merely a special case of the general target α such that the target α equals the unfavorable condition α.

Figure 6:
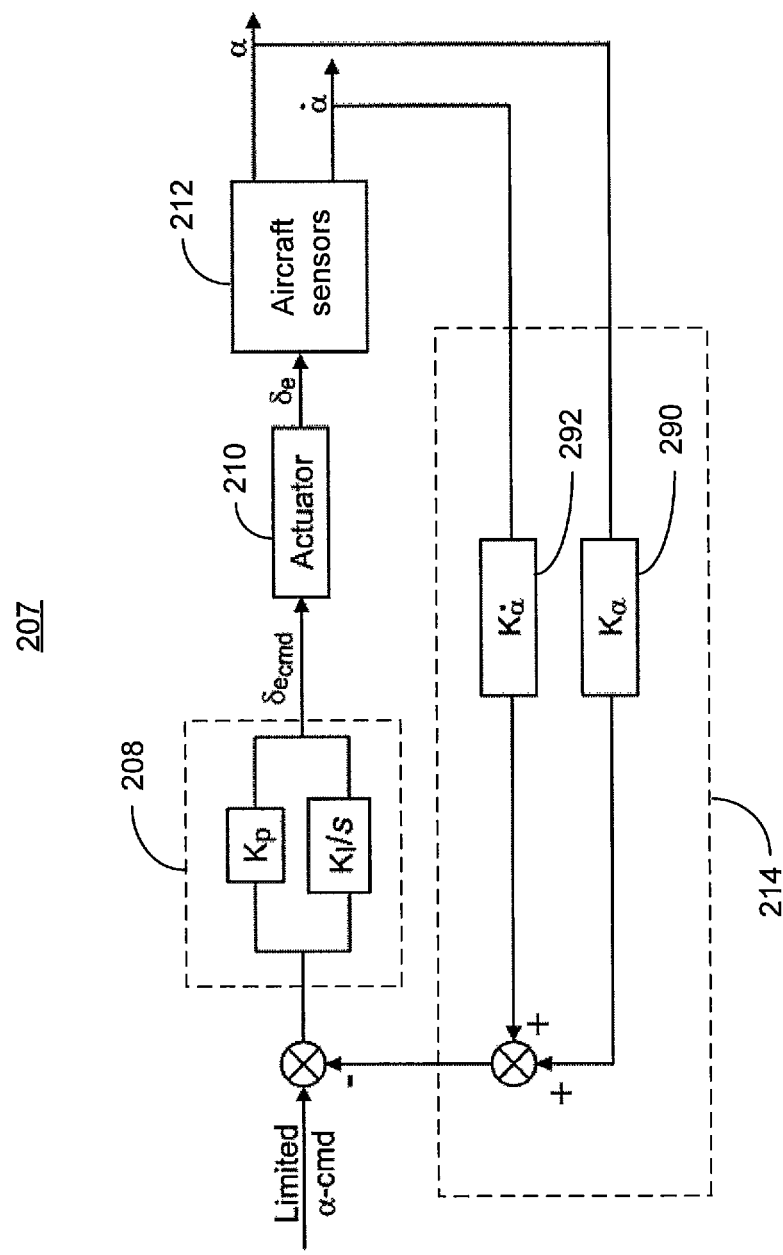
FIG. 6 is a diagram of a subset of the command loop during a mode of operation.

Referring to FIG. 6, a diagram of a flight control loop 207 of FIG. 5 during α-limit operation is illustrated. The feedback gains Kα 290 and K$\dot{\alpha}$ 292 are set to regulate angle of attack with acceptable command-response short-period handling characteristics, as is shown in the exemplary performance graphs discussed below. In an embodiment, K$\dot{\alpha}$ (which is not the same as k$\dot{\alpha}_{limit}$) is set to ensure a short period damping response greater than 0.7 to minimize α overshoot. Both $\dot{\alpha}$ and rate of velocity decrease are effectively limited when the zoom climb protection system (ZCPS) is engaged and overshoot in α and undershoot in velocity 218 are avoided. The α command limit resulting in the limited α-cmd is set as discussed above. The effect is that a pilot cannot intentionally or accidentally bring the vehicle 100 into a flight mode where a rapid deceleration caused by a sustained large aft-column command causes existing control loops to overshoot and potentially leave the vehicle in the unfavorable flight condition.

Figure 7:
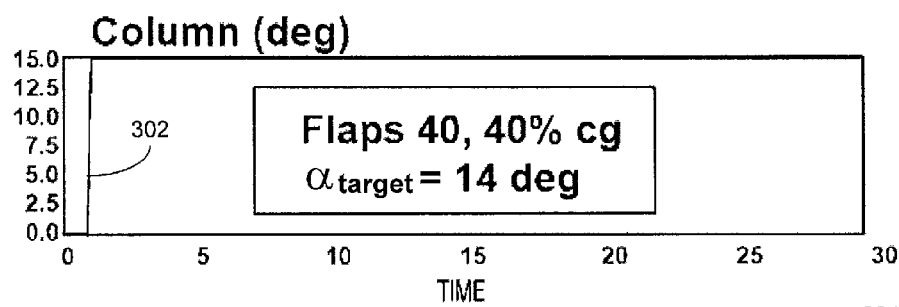
FIG. 7 is a time history graph of control column position in a vehicle illustrating zoom climb UFC protection.
Figure 8:
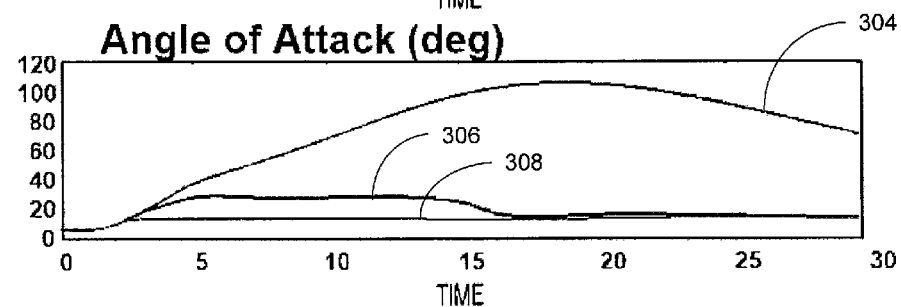
FIG. 8 is a comparative chart of angle of attack of the vehicle.

FIGS. 7-10 illustrate an exemplary embodiment of zoom climb protected α limit compared to existing flight control schemes. FIG. 7 illustrates a full aft column movement by a pilot in a vehicle 100 shown by curve 302. In the exemplary embodiment, the vehicle conditions include flaps at 40, a 40% center of gravity and an α-target of 14 degrees. That is, a maximum α for the vehicle 100 of no greater 14 degrees. FIG. 8 illustrates a resulting α for three different flight control schemes. Curve 304 illustrates a conventional controlled variable C*-like command system with no α limiter. The maximum α exceeds 90 degrees as the vehicle 100 reaches a flight condition that is considered unfavorable. Curve 306 shows the result for a prior art C*-like command system with α-limit. In curve 306, the α eventually settles at the target of 14 degrees after overshooting to above 20 degrees for up to 15 seconds. Curve 308 shows vehicle response using the currently disclosed zoom climb UFC protection with the α of the vehicle 100 controlled at the target of 14 degrees throughout the maneuver with no overshoot.

Figure 9:
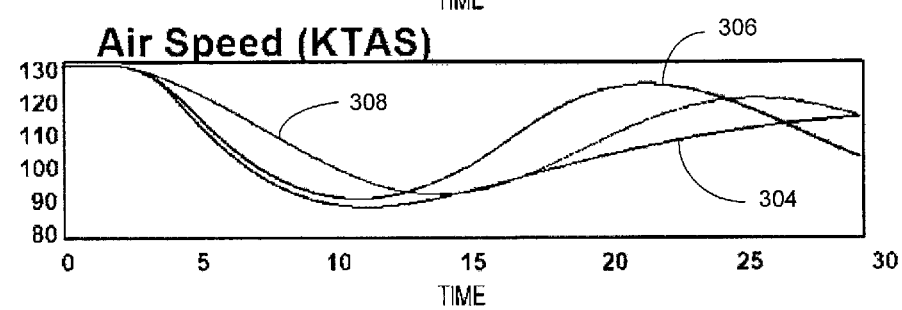
FIG. 9 is a comparative chart of velocity (airspeed) of the vehicle.
Figure 10:
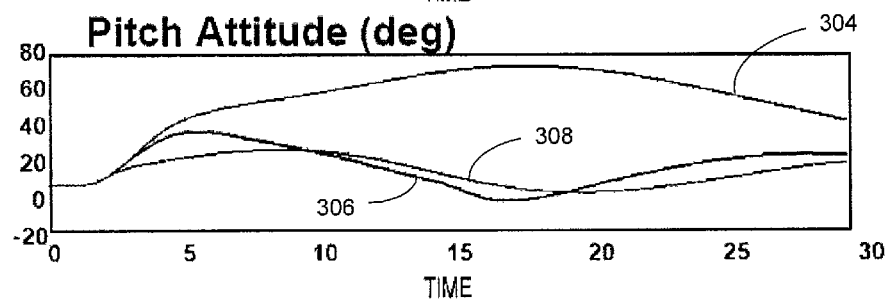
FIG. 10 is a comparative chart of pitch attitude of the vehicle.

FIG. 9 and FIG. 10 illustrate corresponding results of velocity (airspeed) and pitch attitude. Both the C*-like command system and prior art C*-like command control with α-limit curves 304 and 306, respectively, illustrate rapidly falling velocity and corresponding pitch attitudes approaching or exceeding 40 degrees. Even the prior art α-limited command control scheme illustrated by curve 306 is subject to overshoot in a combined with rapidly decreasing velocity that can result in UFC. Because of the risk of this overshoot in the currently deployed systems, large velocity safety margins are built into an airplane's operating speed to prevent the pilot from inadvertently approaching vehicle UFC; however there is no guarantee that the aircraft can always avoid UFC. The result of these large safety margins is that landing speeds are increased to accommodate the margin. Increased landing speeds increase the runway length required to land the aircraft as well as requiring other design tradeoffs.

In contrast, the zoom climb UFC protection curve 308 in FIG. 9 of this exemplary embodiment shows that the rate of deceleration never exceeds the Federal Aviation Regulation (FAR) Part 25 required UFC demonstration rate of 3 knots per second with reduced pitch attitude excursions. Setting the appropriate scaling factors in the feedback gain block 214 ensures acceptable short-period handling qualities when regulating α. A vehicle 100 equipped with zoom climb UFC/α-target protection is essentially protected from entering a unfavorable flight condition and does not require the large safety margins of the prior art systems so that landing speeds can be reduced with corresponding reductions in landing field length and wear and tear on the aircraft.

Figure 11:
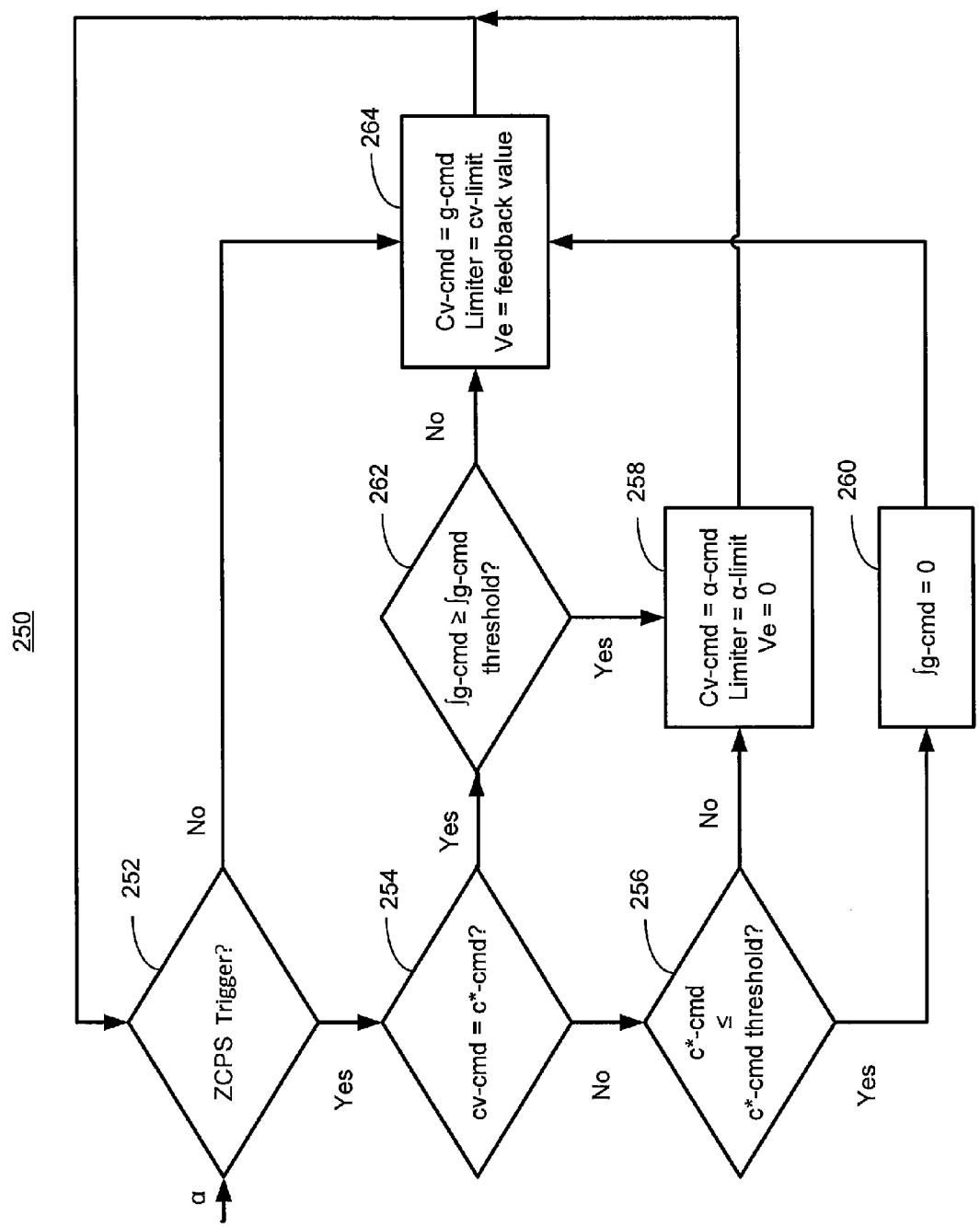
FIG. 11 is a flow chart of entry and exit to zoom climb UFC/angle-of-attack limit protection.

A time history 250 of the zoom climb unfavorable flight condition prevention entry and exit is shown in FIG. 11. The strategy involves first comparing a rate of change of angle of attack to a predetermined limit and then placing the command loop 200 in the zoom climb UFC protection mode when additional criteria are met. At block 252, a threshold test for ZCPS/angle of attack limit is performed. In an embodiment, the test is whether the value of $\alpha_{UFC} - k\dot{\alpha}_{limit} * \dot{\alpha}$ exceeds the current $\alpha$ value. If not, the "no" branch is taken to block 264 and a normal operation mode is set or maintained with the selectors 202, 226, and 234 set to normal operation as shown in FIG. 5.

Figure 12:
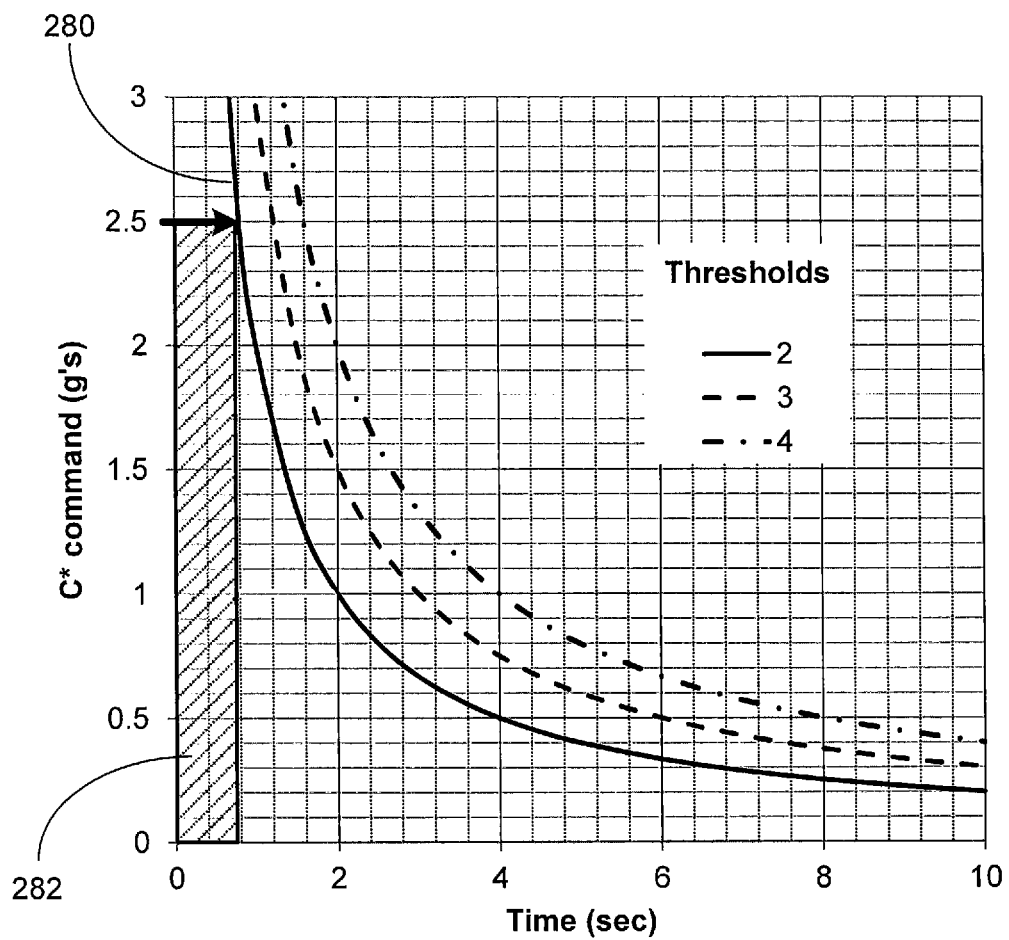
FIG. 12 is an example of use of the integral of c*-cmd in an element of the flow chart of FIG. 11.

If, at block 252 the trigger condition is met, then at block 254 a determination is made as to whether the ZCPS mode is already active. That is, is the cv-cmd set to c*-cmd (yes) or is the cv-cmd set to $\alpha$-cmd (no). If yes, the process continues at block 262 and a determination is made if a time integral of the c*-cmd is greater than or equal to a first threshold value for the time integral of c*-cmd. In an embodiment, the threshold is a simple value such as 2, 3, or 4 depending on airplane configuration and/or flight condition. Turning briefly to FIG. 12, an exemplary set of values for a particular instance of c*-cmd is shown by curve 280. An integral of c*-cmd, that is, an area 282 under the incremental 1-g c*cmd curve 280 is compared to the threshold=2 g-sec. In the illustrated example, the area 282 equals the threshold value of 2 and therefore the trigger for block 262 is met. Returning to FIG. 11, if the trigger value is not met at block 262, execution continues at block 264 with the command loop 200 in normal operation as discussed above and execution continues at block 252. The alternative is discussed below.

Returning to block 254, if the cv-cmd does not equal c*-cmd, that is, that the ZCPS mode is already active, a test is made to determine if the c*-cmd is less than or equal to a c*-cmd threshold, that is, has the pilot eased the control column to a position below that which requires ZCPS. If the c*-cmd is below the c*-cmd threshold, the 'yes' branch is taken to block 260. At block 260, the time integral of c*-cmd is reset to zero and the command loop 200 is returned to normal operation at block 264.

If the c*-cmd is greater than the c*-cmd threshold at block 256, the 'no' branch is taken to block 258. Similarly, if, at block 262, the integral of c*-cmd is greater than or equal to the threshold value of the integral of c*-cmd, execution continues at block 258. At block 258, the selectors 202, 226, and 234 are all set to ZCPS mode with the cv-cmd set to $\alpha$-cmd, the limiter 206 set to $\alpha$-limit, and the velocity error set to zero. From block 258, execution continues at block 252. The time history 250 is but one example of how the entry and exit from ZCPS mode may be performed and other processes with similar results may be contemplated.

To illustrate with a specific example, a vehicle 100 may be operating at a velocity of 130 knots at an altitude of 35 feet. A c*-cmd threshold is 0.5 g. A pilot pulls full back on a control column creating a c*-cmd with a g-force of 2.5 g from an initial $\alpha$ of 6.25 degrees which rises over the course of about 0.55 second to 8.0 degrees. The $\dot{\alpha}$ is then (8-6.25)/0.5 degrees/second or 3.5 degrees/second. For this exemplary embodiment, the value of $k\dot{\alpha}_{limit}$ is 2 seconds and the $\alpha_{UFC}$ is 14 degrees. Referring to FIG. 11, at block 252 the ZCPS trigger is met because the value of $\alpha_{UFC} - k\dot{\alpha}_{limit} * \dot{\alpha}$ is (14 degrees−(2 sec*3.5 degrees/second))=14−7=7, so that the current value of $\alpha$ (8.0 degrees) is $\geq$ to the 7-degree trigger limit.

With the trigger met, execution continues at block 254, the cv-cmd is set to c*-cmd so execution continues at block 262. Continuing the previous example, the ∫g-cmd threshold is 2. The equivalent g-cmd for the full back control column is 2.5 g, meaning that the integral of g-cmd is equal to 2 after a little more than 0.55 seconds at 0.8 seconds, as shown in FIG. 12

With the ∫g-cmd threshold test met at block 262, execution continues at block 258. As discussed above, the selectors 202, 226, and 234 are switched. The cv-cmd is set to $\alpha$-cmd, the Ve is set to zero, and the limiter 206 is set to $\alpha$-limit, the output of block 232. As calculated above, the value of $\alpha_{UFC} - k\dot{\alpha}_{limit} * \dot{\alpha}$ is $\geq \alpha$, so the limit of at block 206 is initially set to 8.4 deg: the value of the variable $\alpha_{limit}$ at the time the ∫g-cmd threshold test is met. The longer it takes for the ∫g-cmd threshold test to be met due to smaller g commands, the higher the value of $\alpha_{limit}$ will be, see, e.g., FIG. 12. This is to be expected since a less radical aft column command from the pilot will result in a slower rate of change in $\alpha$ ($\dot{\alpha}$) such that $\alpha_{UFC} - k\dot{\alpha}_{limit} * \dot{\alpha}$ increases. Therefore, even though the pilot requested $\alpha$ ($\alpha$-cmd) is above 20, the output of the limiter 206 will be capped initially at 8.4. As $\dot{\alpha}$ decreases, the limiter 206 increases in value approaching 14 degrees as $\dot{\alpha}$ goes to zero, in this example, at around 4 seconds.

When the pilot eases the control column so that the requested c*-cmd is below the Threshold of 0.5 g, block 256 becomes true and the 'yes' branch is taken to block 260, which clears the ∫g-cmd value and resets the selectors 202, 226, and 234 to their original, normal, operating state.

The use of a rate of change of angle of attack ($\dot{\alpha}$) for UFC prevention provides a means to limit a rate of deceleration and its use in a special mode of vehicle control ensures that a fly-by-wire vehicle 100 will not reach UFC or exceed a desired angle of attack due to overshoot of angle of attack during rapid deceleration. Because operating at an unfavorable flight condition can be effectively eliminated, excessive UFC margins can be reduced, allowing, among other things, lower speed landings while still guaranteeing Federal Aviation Administration required maneuver performance and turn capability with acceptable handling qualities.

While only certain embodiments have been set forth, alternatives and modifications will be apparent from the above description to those skilled in the art. These and other alternatives are considered equivalents and within the spirit and scope of this disclosure and the appended claims.

What is claimed:

1. A method comprising:
   deflecting a control surface of a vehicle based on a control variable;
   setting a limit for the control variable used to deflect the control surface, the limit set as a function of a rate of change of angle of attack ($\dot{\alpha}$) and one of an unfavorable flight condition (UFC) and a target angle of attack ($\alpha$); and
   preventing a control variable command received from a pilot from exceeding the limit for the control variable when a condition exists;
   wherein the condition is an integral of the control variable command exceeding a predetermined threshold value of the integral of the control variable command; and
   wherein when the control variable command is less than a control variable threshold, the integral of the control variable command is set to zero and the limit on adjusting the control surface is set to maximum value of the control variable.

2. The method of claim 1, wherein setting the limit for the control variable comprises subtracting a gain-adjusted value of $\dot{\alpha}$ from the UFC.

3. The method of claim 1, further comprising controlling a rate of deceleration in conjunction with setting the limit on the control variable.

4. The method of claim 3, wherein the rate of deceleration is limited to 3 knots/second.

5. A method comprising:
deflecting a control surface of a vehicle using a control loop;
determining a condition exists; and
when the condition exists, setting a limit on deflecting the control surface based on a rate of change of angle of attack;
wherein the condition is an integral of a control variable exceeding a predetermined threshold value of the integral of the control variable; and
wherein when the control variable is less than a control variable threshold, the condition does not exist, the integral of the control variable is set to zero and the limit on adjusting the control surface is set to maximum value of the control variable.

6. The method of claim 5, further comprising:
setting a velocity error of the control loop to zero when the condition exists.

7. The method of claim 5, wherein setting the limit on deflecting the control surface based on the rate of change of angle of attack comprises setting the limit equal to a variable value of one of an unfavorable flight condition (UFC) and a target α, less a product of a current rate of change of angle of attack and a factor.

8. The method of claim 7, wherein the variable value of one of the UFC and the target α is determined according to a combination of wing configuration, a velocity (Mach) of the vehicle, and an altitude of the vehicle.

9. The method of claim 5, further comprising limiting vehicle deceleration, as a function of deflecting the control surface, based on the rate of change of angle of attack.

10. The method of claim 9, wherein an $\dot{\alpha}$ feedback gain in the control loop is selected to cause a damping response greater than 0.7.

11. The method of claim 10, wherein the $\dot{\alpha}$ feedback gain is selected to limit velocity deceleration to a rate of 3 knots per second.

12. A system comprising:
an airframe;
a flight control used by a pilot of a vehicle to generate a control variable related to an attitude of the vehicle;
a control surface that affects the attitude of the vehicle in flight;
an angle-of-attack sensor coupled to the airframe; and
a flight-critical digital computer coupled to the flight control, the angle-of-attack sensor, and the control surface, the flight-critical digital computer including a processor and a memory, the memory having computer executable instructions that when executed by the processor cause the flight-critical digital computer to:
receive the control variable from the flight control;
deflect the control surface responsive to the control variable received from the flight control;
determine when a time integral of the control variable exceeds a threshold value of the time integral of the control variable;
when the time integral of the control variable exceeds the threshold value of the time integral of the control variable, set a limit on the control variable as a function of a rate of change of angle of attack ($\dot{\alpha}$) and one of an unfavorable flight condition (UFC) and a target angle of attack (α) to restrict movement of the control surface that prevents the vehicle from exceeding a calculated angle-of-attack; and
when the time integral of the control variable is less than the threshold value of the time integral of the control variable, set the time integral of the control variable to zero and the limit on the control variable to a maximum control variable value.

13. The system of claim 12 further comprising:
a velocity sensor that reports a velocity of the vehicle; and
an altitude sensor that reports an altitude of the vehicle, wherein the flight-critical digital computer uses the velocity and the altitude of the vehicle to determine one of the UFC and the target α.

* * * * *